United States Patent
Koenig et al.

[11] 3,862,201
[45] Jan. 21, 1975

[54] PRODUCTION OF 1-ALKENYL ISOCYANATES

[76] Inventors: Karl-Heinz Koenig, 8a Pierstrasse, 6710 Frankenthal; Hans Kiefer, 5 Im Sandgarten, 6706 Wachenheim, both of Germany

[22] Filed: Apr. 30, 1970

[21] Appl. No.: 33,489

[30] Foreign Application Priority Data
May 2, 1969 Germany.................P 19 22 412

[52] U.S. Cl....260/453 P, 260/453 AL, 260/453 AR, 260/453 PH
[51] Int. Cl.......................................... C07c 119/04
[58] Field of Search................... 260/453 P, 453 AL

[56] References Cited
UNITED STATES PATENTS

| | | | |
|---|---|---|---|
| 3,242,140 | 3/1966 | Hoover............................ | 260/453 X |
| 3,311,654 | 3/1967 | Sayigh et al. ...................... | 260/453 |
| 3,468,923 | 9/1969 | Koenig et al...................... | 260/453 |

*Primary Examiner*—Lewis Gotts
*Assistant Examiner*—Dolph H. Torrence
*Attorney, Agent, or Firm*—Johnston, Keil, Thompson and Shurtleff

[57] ABSTRACT

Production of 1-alkenyl isocyanates having the general formula (I):

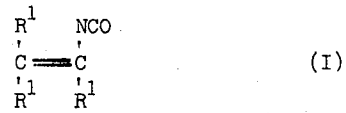

where the individual radicals $R^1$ may be identical or different and each denotes a hydrogen atom, an alkyl, cycloalkyl, aralkyl or aryl radical, two of the radicals $R^1$ (when they do not denote hydrogen atoms) may denote members of a carbocyclic ring while the third radical $R^1$ has the above meanings, by subjecting a N-(1-alkenyl)-N-tert-alkylcarbamyl chloride having the general formula:

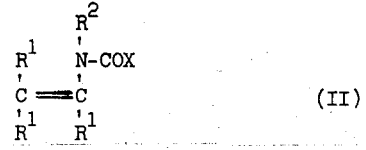

where $R^1$ has the meanings given above and $R^2$ denotes a tertiary alkyl group and X denotes a halogen atom to thermal cleavage. 1-alkenyl isocyanates are valuable monomers and comonomers.

2 Claims, No Drawings

PRODUCTION OF 1- ALKENYL ISOCYANATES

The present invention relates to a process for the production of 1-alkenyl isocyanates by heating N-1-alkenyl-N-t-alkylcarbamyl chlorides.

It is known that 1-alkenyl isocyanates can be prepared by Curtius degradation of azides of $\alpha,\beta$-unsaturated carboxylic acids (cf. for example Journal of Organic Chemistry, volume 26 (1961), pages 770 to 779, and volume 27 (1962), pages 1454 and 1455, Chem. Ber. 98, 650 to 652 (1965), and Bull. Soc. Chim. Belg., 65, 291 (1956)). In spite of the interest which the 1-alkenyl isocyanates have aroused as valuable monomers or comonomers for the production of polymerized substances (cf. the first literature reference mentioned), the said methods have not been practised on a commercial scale because of the ready decomposability of the azides and because of the risk of explosion involved in handling them (cf. Houben-Weyl, "Methoden der organischen Chemie," 8, 124–125 (1952) and U.S. Pat. No. 2,334,476).

The present invention has for an object to provide a process by which 1-alkenyl isocyanates can be manufactured on a commercial scale without risk. Another object of the invention is to provide a process by which 1-alkenyl isocyanates can be manufactured in good to excellent yields.

In accordance with this invention, these and other objects and advantages are obtained in a process for the production of 1-alkenyl isocyanates having the general formula (I):

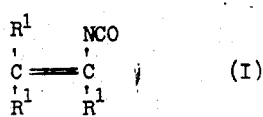

where the individual radicals $R^1$ may be identical or different and each denotes a hydrogen atom or an alkyl, cycloalkyl, aralkyl or aryl radical or two radicals $R^1$ (which do not denote hydrogen atoms) may denote members of a carbocyclic ring while the third radical $R^1$ has the said meanings by the thermal cleavage of a N-(1-alkenyl)-N-tert-alkylcarbamyl chloride having the general formula (II):

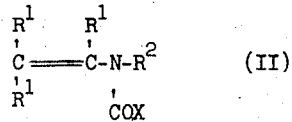

where $R^1$ has the said meanings and $R^2$ denotes a tert-alkyl group which may bear inert radicals as substituents and X denotes a halogen atom.

Particularly good yields can be obtained by the thermal cleavage of the starting materials (II) in the presence of metal compounds.

The N-(1-alkenyl)-N-t-alkylcarbamyl chlorides used as starting materials can be obtained for example by reaction of phosgene with appropriate Schiff's bases by the process of U.S. Pat. application Ser. No. 887,346, filed Dec. 22, 1969 by Hans Kiefer et al.

Preferred starting materials (II) and consequently preferred end products (I) are those in whose formulae the individual radicals $R^1$ are identical or different and each denotes a hydrogen atom, an alkyl radical particularly having one to twenty and especially one to eight carbon atoms, a cycloalkyl radical, particularly having five to twelve and especially five to eight carbon atoms, an aralkyl radical, particularly having seven to twelve carbon atoms, or an aryl radical having not more than twelve carbon atoms, or two of the radicals $R^1$ (which do not denote hydrogen atoms) may denote members of a five-membered to twelve-membered, particularly five-membered to eight-membered, carbocyclic ring while the third radical $R^1$ has the said meanings. Two radicals $R^1$ situated on two different carbon atoms may also be members of a polycycloalkyl radical, particularly a bicycloalkyl radical having seven to ten carbon atoms or a tricycloalkyl radical having seven to twelve carbon atoms. Radicals $R^1$ (which do not denote hydrogen atoms) having hydrocarbon character are particularly preferred).

Preferred t-alkyl groups $R^2$ contain four to ten, particularly four to six, carbon atoms. The said radicals may also bear as substituents, groups and/or atoms which are inert under the reaction conditions, for example chlorine atoms, bromine atoms, trifluoralkyl, alkoxy, alkylthio, or alkysulfonyl groups each having one to four carbon atoms, nitro groups or phenoxy groups. X in the preferred starting materials (II) denotes an iodine atom, a bromine atom and particularly a chlorine atom.

Examples of suitable starting materials (II) are:
N-vinyl-N-t-butylcarbamyl chloride,
N-vinyl-N-t-amylcarbamyl chloride,
N-1-propenyl-N-t-butylcarbamyl chloride,
N-2-propenyl-N-t-butylcarbamyl chloride,
N-1-butenyl-N-t-butylcarbamyl chloride,
N-1-methyl-1-propenyl-N-t-butylcarbamyl chloride,
N-2-methyl-1-propenyl-N-t-butylcarbamyl chloride,
N-1-ethyl-1-hexenyl-N-t-butylcarbamyl chloride,
N-1-cyclohexenyl-N-t-butylcarbamyl chloride,
N-1-cyclooctenyl-N-t-butylcarbamyl chloride,
N-1-cyclopentenyl-N-t-butylcarbamyl chloride,
N-2-phenylvinyl-N-t-butylcarbamyl chloride and
N-2-phenyl-2-methylvinyl-N-t-butylcarbamyl chloride.

For the production of the 1-alkenyl isocyanates (I), the starting materials (II) are generally heated at temperatures of from 20° to 300°C so that the 1-alkenyl isocyanate is formed by elimination of t-alkyl halide or a dehydrohalogenation product of the same and hydrogen halide. The starting material (II) may be brought to the reaction temperature in liquid of gaseous phase.

When working in the liquid phase, the starting material may be subjected to thermal cleavage as such or in the presence of an inert diluent. The starting material is however generally subjected to thermal cleavage in the absence of diluents.

For reacting the starting materials in gaseous phase, it is necessary for the starting material which is usually liquid to be converted into the gaseous phase prior to the thermal cleavage.

This may be achieved for example by using subatmospheric pressure or by passing an inert gas, for example nitrogen or carbon dioxide, through the liquid starting material.

The reaction is generally carried out at atmospheric pressure. It is also possible however to carry out the cleavage at superatmospheric pressure, for example at 3 atmospheres, or at subatmospheric pressure, for example 300 mm. A preferred embodiment of the process consists in carrying out the thermal cleavage of the starting material (II) in the presence of a metal compound, particularly a metal salt, as a catalyst. When carrying out the reaction in the presence of the said metal compounds, the reaction temperature is greatly decreased and at the same time the yield of 1-alkenyl isocyanate is increased. Whereas in the absence of the said metal compounds it is preferable to use reaction temperatures of from 100° to 250°C, particularly from 130° to 200°C, in the presence of the said metal compounds, the reaction is preferably carried out at temperatures of from 30° to 160°C, particularly from 30° to 120°C. In the catalytic thermal cleavage of for example N-vinyl-N-t-butylcarbamyl chloride, an equimolar mixture of vinyl isocyanate and t-butyl chloride is obtained in practically a quantitative yield. Smaller yields of vinyl isocyanate and t-butyl chloride are obtained however in the non-catalyzed thermal cleavage, isobutylene, phosgene and hydrogen chloride being formed as byproducts.

Compounds of metals of groups $3a$, $4a$, $5a$ and $7b$ and the transitional elements of the Periodic System (cf. Handbook of Chemistry and Physics, 49 th edition (1968–1969)) are preferably used. Organic or inorganic metal compounds are suitable as catalysts. It is advantageous to use metal salts and the nature of the anion is not critical. Examples of suitable metal compounds ase lead(II) chloride, antimony(III) chloride, copper(I) chloride, copper(II) chloride, cadmium(II) phosphate, mercury(II) chloride, bromide, sulfate and acetate, chromium(III) chloride, manganese(II) chloride, palladium(II) chloride, bismuth(III) chloride, zinc chloride and zinc cyanide. The amount of catalyst may vary within wide limits. Generally the catalyst is used in an amount of from 0.1 to 100% by weight, particularly 1 to 20% by weight, with reference to the starting material. Larger amounts of catalyst, for example 200% by weight, are not injurious. The catalyst may be used as such or after application to an inert carrier such as aluminium oxide, silica gel or activated carbon. In the former case, it is conveniently used in finely divided form.

The process according to the invention may be carried out batchwise or continuously.

The process may be carried out for example as follows: the whole of the atarting material (II), in the presence or absence of a catalyst, is heated to the reaction temperature in a vessel while stirring and the 1-alkenyl isocyanate and/or t-alkyl halide distilled off over a column. The starting material may however be passed in liquid or gas phase through a heated tube (which may contain the catalyst) and the reaction product obtained then worked up, for example by rectification. To facilitate separation of the 1-alkenyl isocyanate from the reaction product by distillation, it is preferred to choose starting materials which yield a 1-alkenyl isocyanate and a t-alkyl chloride whose boiling points are clearly different, for example by more than 10°C. If the 1-alkenyl isocyanate has a lower boiling point than the accompanying t-alkyl halide, the 1-alkenyl isocyanate alone may be distilled off from the reaction mixture. It is preferably however to distil off both reaction products from the reaction mixture because the rate of reaction is thereby increased.

1-alkenyl isocyanates are valuable monomers or comonomers for the production of polymerized substances.

The following Examples illustrate the invention. The parts specified in the Examples are parts by weight.

EXAMPLE 1

162 parts of N-vinyl-N-t-butylcarbamyl chloride is placed in a stirred vessel having a superimposed column (having about 3 to 6 theoretical trays), 20 parts of anhydrous powdered zinc chloride is added and the whole is heated with stirring. At an internal temperature of about 70°C, a mixture of vinyl isocyanate and t-butyl chloride begins to distil over the top of the column so that the temperature in the stirred vessel falls to 50° to 60°C. Cleavage is over after a hour. 158 parts of an equimolar mixture of vinyl isocyanate and t-butyl chloride is obtained. This mixtures may be used direct for the production of a number of reaction products of vinyl isocyanate. To recover pure vinyl isocyanate, the mixture is subjected to fractional distillation over an efficient column. The first fraction obtained is 65 parts (94% of the theory) of pure vinyl isocyanate having a boiling point of 37°C and the second fraction is 87 parts of t-butyl chloride having a boiling point of 51°C.

EXAMPLE 2

The procedure described in Example 1 is followed with the 20 parts of zinc chloride replaced by 10 parts of the metal salt ($MeX_n$) indicated in the first column of the following Table. The reaction temperature in °C is given in the second column. The third column gives the amount of distillate (in parts) up to a transition temperature at 760 mm of not more than 52°C. The fourth column gives the yield of vinyl isocyanate (in % of the theory) obtained after fractional distillation of the first distillate:

Table

| $MeX_n$ | °C | Parts | % of Th. |
|---|---|---|---|
| $PbCl_2$ | 114 | 125 | 61 |
| $SbCl_3$ | 48 | 129 | 73 |
| $CuCl$ | 77 | 134 | 79 |
| $CuCl_2$ | 73 | 148 | 89 |
| $Cd_3(PO_4)_2$ | 76 | 122 | 72 |
| $HgCl_2$ | 46 | 158 | 95 |
| $HgBr_2$ | 46 | 156 | 94 |
| $HgSO_4$ | 58 | 146 | 88 |
| $CrCl_3$ | 119 | 115 | 55 |
| $MnCl_2$ | 70 | 149 | 90 |
| $PdCl_2$ | 58 | 159 | 96 |
| nickel oxalate | 100 | 133 | 72 |
| $ZnSiO_4$ | 95 | 140 | 86 |
| $ZnF_2$ | 65 | 130 | 80 |
| $ZnBr_2$ | 65 | 132 | 81 |
| $BiOCl_3$ | 85 | 130 | 80 |
| zinc acetate | 55 | 131 | 85 |
| $ZnCO_3$ | 90 | 115 | 71 |
| $ZnO$ | 65 | 133 | 82 |
| $ZnS$ | 100 | 129 | 80 |
| zinc trichloroacetate | 75 | 127 | 77 |

EXAMPLE 3

50 parts of N-vinyl-N-t-butylcarbamyl chloride and 20 parts of bismuth(III) chloride are heated with stirring in a stirred apparatus having a superimposed column. After cleavage has been started at an internal temperature of 46°C, further starting material is added at the rate at which a mixture of vinyl isocyanate and t-butyl chloride distils over the top of the column at a transition temperature of 40° to 42°C. 472 parts (97% of the theory) of an equimolar mixture of vinyl isocyanate and t-butyl chloride is obtained from a total of 486 parts of N-vinyl-N-t-butylcarbamyl chloride.

EXAMPLE 4

The procedure of Example 1 is followed but 150 parts of N-2-methylpropen-1-yl-N-t-butylcarbamyl chloride is used instead of N-vinyl-N-t-butylcarbamyl chloride and 5 parts of zinc chloride is used as catalyst. Cleavage begins at 70°C. Owing to the higher boiling point of the cleavage product it is necessary to raise the temperature in the stirred vessel to 120° to 130°C at the end of the cleavage. The distillate obtained is 140 parts of equimolar mixture of 2-methylpropen-1-yl isocyanate and t-butyl chloride having a boiling point of 49° to 107°C. The mixture can easily be separated into its components by fractional distillation. 70 parts (91% of the theory) of 2-methylpropen-1-yl isocyanate having a boiling point of 74°C at 260 mm is obtained in addition to 65 parts of t-butyl chloride.

EXAMPLE 5

100 parts of N-vinyl-N-t-butylcarbamyl chloride is heated in a stirred container having a superimposed column while stirring. 74 parts of reaction product destils over at an internal temperature of 140°C within 1 hour in a boiling range of from 34° to 71°C. 20 parts of vinyl isocyanate and 29 parts of t-butyl chloride (equivalent to a yield of 46% of the theory) can be recovered from the distillate by fractional destillation over an efficient column.

EXAMPLE 6

80 parts of N-vinyl-N-t-butylcarbamyl chloride has 15 parts of anhydrous powdered zinc cyanide added to it while cold and then it is heated with continuous stirring; thermal cleavage of the carbamyl chloride begins at 80°C, hydrocyanic acid being disengaged. The temperature in the flask falls quickly to 50°C and an equimolar mixture of vinyl isocyanate and t-butyl chloride distils over the top of a superimposed column. Another 730 parts of carbamyl chloride is dripped in at the rate at which cleavage products distil over. 769 parts of distillate having a boiling point of 39° to 45°C is obtained which according to NMR analysis contains 50% molar of vinyl isocyanate and 40% molar of t-butyl chloride and 2% molar of isobutylene. This is equivalent to a yield of vinyl isocyanate of 95% of the theory.

EXAMPLE 7

10 parts of finely powdered anhydrous zinc chloride is mixed with 176 parts of N-vinyl-N-2-methyl-butyl-(2)-carbamyl chloride having a boiling point of 96°C at 12 mm and heated while stirring in a stirred vessel having a superimposed column. Thermal cleavage begins at an internal temperature of 58°C and in the course of thirty minutes 87 parts of a mixture of 78% molar of vinyl isocyanate and 22% molar of 2-methyl-butyl-2chloride distils over. The internal temperature is gradually raised to 130°C during the thermal cleavage. The yield of vinyl isocyanate is 88% of the theory.

EXAMPLE 8

2 parts of zinc chloride is placed in an evacuated distillation apparatus and at an internal temperature of 125° to 130°C 25.2 parts of N-2-phenyl-2-methylvinyl-N-t-butylcarbamyl chloride is added in portions while stirring. 13.6 parts of 2-phenyl-2-methylvinyl isocyanate distils off in the course of 30 minutes in a boiling point range of 72° to 83°C at 1 to 2 mm. The more readily volatile cleavage products collect in a subsequent cooled trap. By repeated distillation, 12 parts of pure 2-phenyl-2-methylvinyl isocyanate having a boiling point of 74° to 77°C at 0.2 mm is obtained as a cis-trans mixture in the ratio 65:35. The yield is 75% of the theory.

We claim:

1. A process for the production of 1-alkenyl isocyanates having the formula (I)

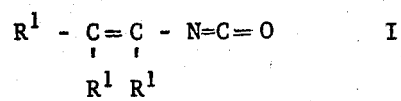

where the individual radicals $R^1$ may be identical or different and each denotes hydrogen or alkyl having one to twenty carbon atoms, cycloalkyl having five to twenty carbon atoms, aralkyl having seven to twelve carbon atoms or aryl having not more than twelve carbon atoms, or two radicals $R^1$ which are not hydrogen denote members of a five-membered to twelve-membered carbocyclic ring, while the third radical $R^1$ has the said meanings which comprises the thermal cleavage of an N-(1-alkenyl)-N-t-alkylcarbamoyl chloride having the formula II

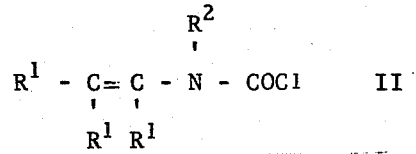

where $R^1$ has the said meanings and $R^2$ denotes a t-butyl or t-pentyl group which may bear inert substituents at temperatures of from 20° to 300°C in the presence of a metal salt selected from the group consisting of zinc(II), mercury(II), lead(II), copper(II), cadmium(II), antimony(III), chromium(III), manganese(II), palladium(II), nickel(II), bismuth(III) and bismuth(V) salts.

2. A process for the production of vinyl isocyanate as claimed in claim 1 which comprises the thermal cleavage of N-vinyl-N-t-butylcarbamoyl chloride in the presence of a metal salt selected from the group consisting of zinc(II), mercury(II), cadmium(II), bismuth(III) and bismuth(V) salts.

* * * * *

UNITED STATES PATENT AND TRADEMARK OFFICE
CERTIFICATE OF CORRECTION

PATENT NO. : 3,862,201
DATED : January 21, 1975
INVENTOR(S) : Karl-Heinz Koenig et al.

It is certified that error appears in the above-identified patent and that said Letters Patent are hereby corrected as shown below:

In the Heading, insert -- [73] Assignee: Badische Anilin- & Soda-Fabrik, Rheinland-Pfalz, Germany--

In Column 3, Line 44, delete "atarting" and substitute --starting--

Signed and Sealed this

Thirty-first Day of August 1976

[SEAL]

Attest:

RUTH C. MASON
*Attesting Officer*

C. MARSHALL DANN
*Commissioner of Patents and Trademarks*